US009776261B2

(12) United States Patent
Wiker et al.

(10) Patent No.: US 9,776,261 B2
(45) Date of Patent: Oct. 3, 2017

(54) TABLE SAW WITH FOLDABLE TABLETOP

(75) Inventors: Juergen Wiker, Schaumburg, IL (US); Ralph Dammertz, Palatine, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 1410 days.

(21) Appl. No.: 13/273,543

(22) Filed: Oct. 14, 2011

(65) Prior Publication Data
US 2013/0092002 A1    Apr. 18, 2013

(51) Int. Cl.
*B23D 47/02*    (2006.01)
*B23D 45/06*    (2006.01)

(52) U.S. Cl.
CPC ........... *B23D 47/025* (2013.01); *B23D 45/06* (2013.01); *Y10T 83/7722* (2015.04)

(58) Field of Classification Search
CPC ...... B23D 47/025; B23D 47/02; B27B 5/222; B27B 5/16; Y10T 83/7722; Y10T 83/7684; Y10T 83/768; Y10T 83/95; Y10T 83/773; A47B 1/00; A47B 1/08; A47B 3/00; A47B 1/002; A47B 5/00; A47B 5/04
USPC .... 83/477, 471, 469, 859, 477.2; 144/286.1, 144/286.5, 287; 108/59, 67–69, 65, 90, 108/99, 100, 162, 166, 173, 121, 127, 108/128
See application file for complete search history.

(56) References Cited

U.S. PATENT DOCUMENTS

| | | | | |
|---|---|---|---|---|
| 2,697,460 | A | * | 12/1954 | Barnett .......................... 144/285 |
| 4,068,551 | A | * | 1/1978 | Kreitz .......................... 83/471.3 |
| 4,106,381 | A | * | 8/1978 | Kreitz .......................... 83/477.2 |
| 4,677,920 | A | * | 7/1987 | Eccardt .......................... 108/69 |
| 4,860,807 | A | | 8/1989 | Vacchiano |
| 4,974,651 | A | * | 12/1990 | Carmon et al. ............ 144/286.1 |
| 5,105,862 | A | * | 4/1992 | Skinner et al. ............... 144/287 |

(Continued)

FOREIGN PATENT DOCUMENTS

| | | |
|---|---|---|
| CN | 2702809 Y | 6/2005 |
| DE | 3619947 C1 | 1/1988 |

(Continued)

OTHER PUBLICATIONS

International Search Report in corresponding PCT Application (i.e., PCT/US2012/059243) completed Jan. 24, 2013 (10 pages).

(Continued)

*Primary Examiner* — Phong Nguyen
(74) *Attorney, Agent, or Firm* — Maginot Moore & Beck LLP

(57) ABSTRACT

A table saw assembly in one embodiment includes a base portion, a saw blade opening, a saw assembly and a first extension. The base portion includes a base work piece support surface which defines a support plane. The saw blade opening is defined in the base work piece support surface. The saw assembly includes a saw blade which is positionable to extend upwardly through the saw blade opening. The first extension includes a first extension work piece support surface which is pivotable with respect to the base portion between a first position and a second position. In the first position, the first extension work piece support surface is coplanar with the base work piece support surface. In the second position, the first extension work piece support surface is located above the support plane.

15 Claims, 11 Drawing Sheets

(56) References Cited

U.S. PATENT DOCUMENTS

| | | | |
|---|---|---|---|
| 5,479,972 A | 1/1996 | Keating et al. | |
| 6,209,597 B1* | 4/2001 | Calcote | 144/329 |
| 6,668,696 B1* | 12/2003 | Krohmer et al. | 83/477.2 |
| 6,948,539 B1* | 9/2005 | Barker et al. | 144/286.5 |
| 7,926,523 B2 | 4/2011 | Williams et al. | |
| 2005/0034783 A1* | 2/2005 | Laird | 144/286.5 |

FOREIGN PATENT DOCUMENTS

| | | |
|---|---|---|
| EP | 2484473 A1 | 8/2012 |
| FR | 2828431 A1 | 2/2003 |
| TW | 530566 U | 5/2003 |
| TW | M324551 U | 1/2008 |
| TW | M439551 U | 10/2012 |
| WO | 2004039210 A2 | 5/2004 |

OTHER PUBLICATIONS

Rousseau, digital photograph of Rousseau Table Saw Stand . . . Model 2600, available at least as early as Oct. 6, 2011.
Taiwan Search Report and Written Opinion corresponding to Taiwan Application No. 101137576 (10 pages).

* cited by examiner

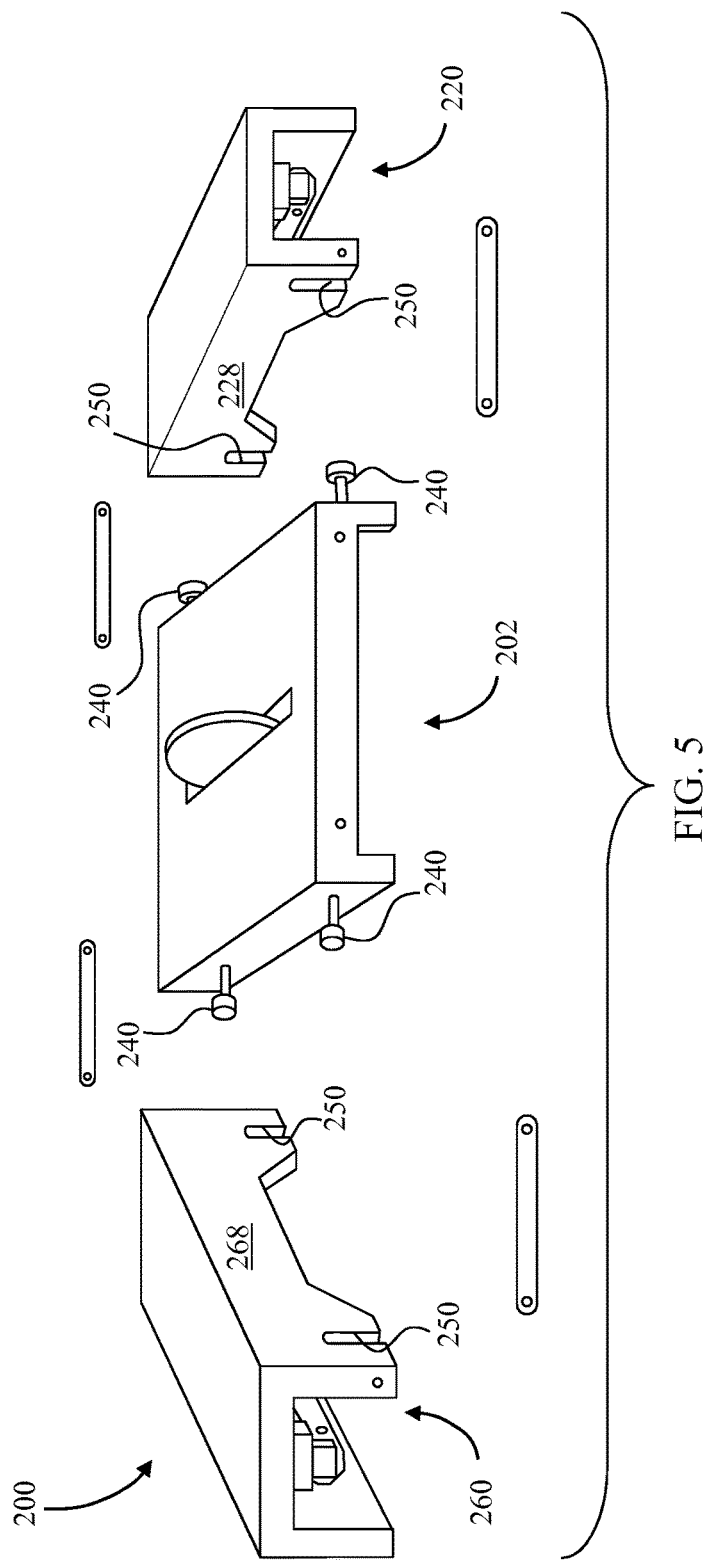

TABLE SAW WITH FOLDABLE TABLETOP

Cross-reference is made to U.S. Utility patent application Ser. No. 13/273,624 entitled "Table Saw with Foldable Tabletop and Handle" by Juergen Wiker et al., which was filed on Oct. 14, 2011 and U.S. patent application Ser. No. 13/273,671 entitled "Table Saw with Foldable Tabletop" by Juergen Wiker et al., which was filed on Oct. 14, 2011, the entirety of each of which is incorporated herein by reference. The principles of the present invention may be combined with features disclosed in those patent applications.

FIELD

This invention relates to tables saws and more specifically to table saws having reconfigurable workpiece support surfaces.

BACKGROUND

A typical table saw includes a cutting instrument, usually a saw blade, attached to a motor mounted beneath a work surface, commonly called a table. The table has an opening that allows a portion of the blade to extend therethrough. To make a cut, a user places material on the table and directs the material past the rotating blade.

A wide range of table saws are available for a variety of uses. Some table saws include only stationary rotating saw blades and other table saws allow for linear movement of the rotating saw blade along the surface of the table. In general, table saws are relatively large power tools which are, due to their size, difficult to handle and transport. They also require a lot of space when stored. Table saws with smaller table tops may be easier to transport and store, but they limit the size of the work surface and, thus, the utility of the saw.

In view of the foregoing, it would be advantageous to provide an improved table saw assembly. It would be advantageous if this table saw assembly is easier to carry, transport and store than conventional saws. It would also be advantageous if this table saw assembly provides the table top work surface area of a conventional large size table saw. Additionally, it would be advantageous if, when folded, this table saw assembly included a protective area for the saw blade such that the saw blade may not require removal or adjustment during transport to reduce the risk of injury or damage.

SUMMARY

In accordance with one embodiment of the disclosure, there is provided a table saw assembly, including a base portion, a saw blade opening, a saw assembly and a first extension. The base portion includes a base work piece support surface which defines a support plane. The saw blade opening is defined in the base work piece support surface. The saw assembly includes a saw blade which is positionable to extend upwardly through the saw blade opening. The first extension includes a first extension work piece support surface which is pivotable with respect to the base portion between a first position and a second position. In the first position, the first extension work piece support surface is coplanar with the base work piece support surface. In the second position, the first extension work piece support surface is located above the support plane.

The above described features and advantages, as well as others, will become more readily apparent to those of ordinary skill in the art by reference to the following detailed description and accompanying drawings. While it would be desirable to provide a table saw with a table top that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 5 depicts an exploded perspective view of an alternative embodiment of a table saw assembly including slots on the extensions and connecting pins on the base portion;

DESCRIPTION

Figure 1:
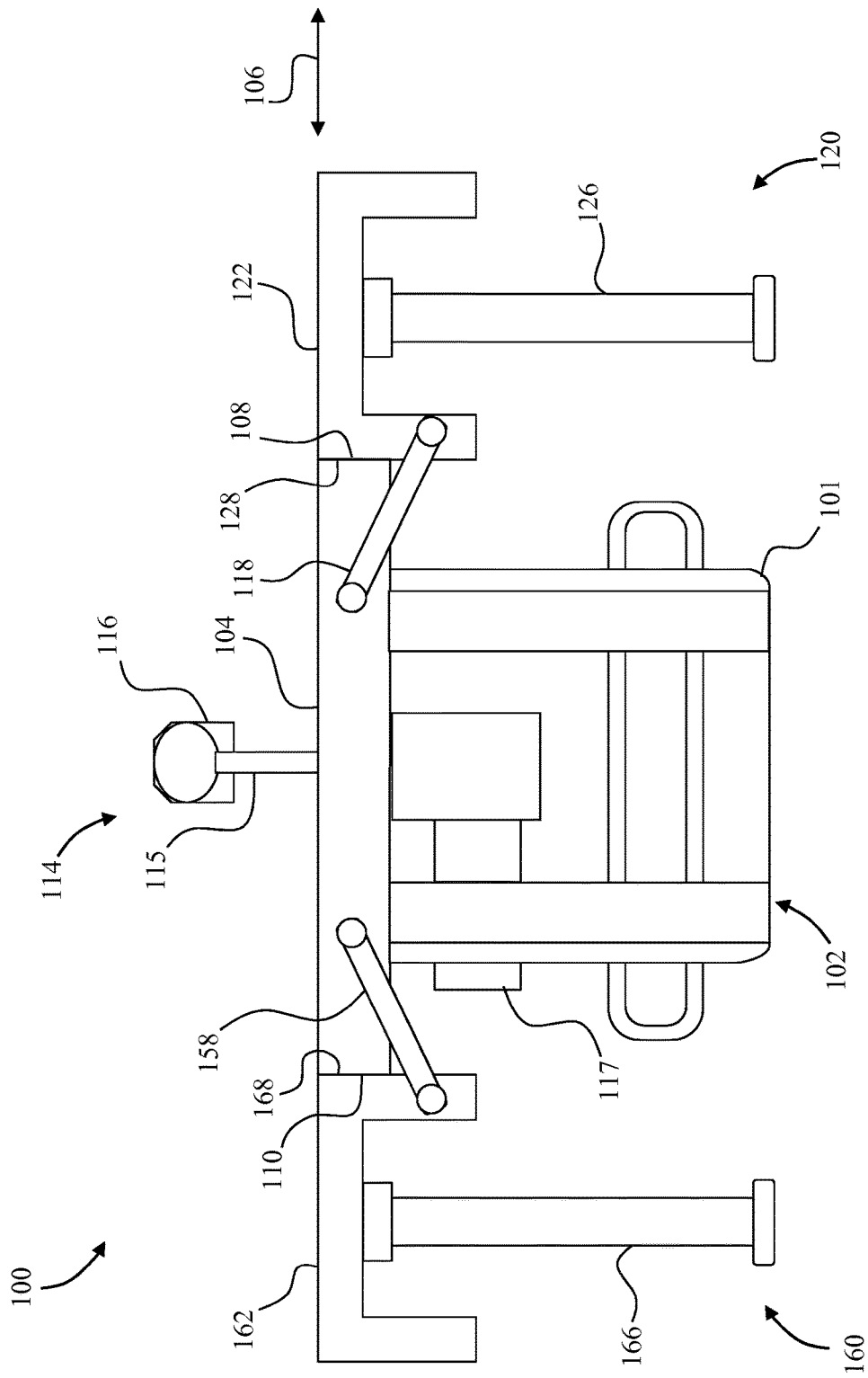
FIG. 1 depicts a front elevational view of a table saw assembly including a base portion and two extensions that are pivotable with respect to the base portion.

FIG. 1 depicts a table saw assembly 100 including a base portion 102, an extension 120 and an extension 160. The base portion 102 includes a support frame 101, a base work piece support surface 104 and a saw blade assembly 114. The support frame 101 may be any desired type of support structure. One type of support structure that may be used as the support frame 101 is the support structure disclosed in the U.S. patent application Ser. No. 12/834,795 filed on Jul. 12, 2010 (hereinafter "the '795 Application"), the disclosure of which is incorporated herein by reference in its entirety. Another type of support structure that may be used as the support frame 101 is the support structure disclosed in the U.S. patent application Ser. No. 12/548,347 filed on May 6, 2010 (hereinafter "the '347 Application"), the disclosure of which is incorporated herein by reference in its entirety.

The extension 120 is connected to the base portion 102 by pivot assemblies 118 which are configured to allow the extension 120 to pivot relative to the base portion 102. Similarly, the extension 160 is connected to the base portion 102 by pivot assemblies 158 which are configured to allow the extension 160 to pivot relative to the base portion 102. The extension 120 is connected to the base portion 102 by two pivot assemblies 118 (see FIG. 2) and the extension 160 is connected to the base portion 102 by two pivot assemblies 158 (see FIG. 2).

Figure 2:
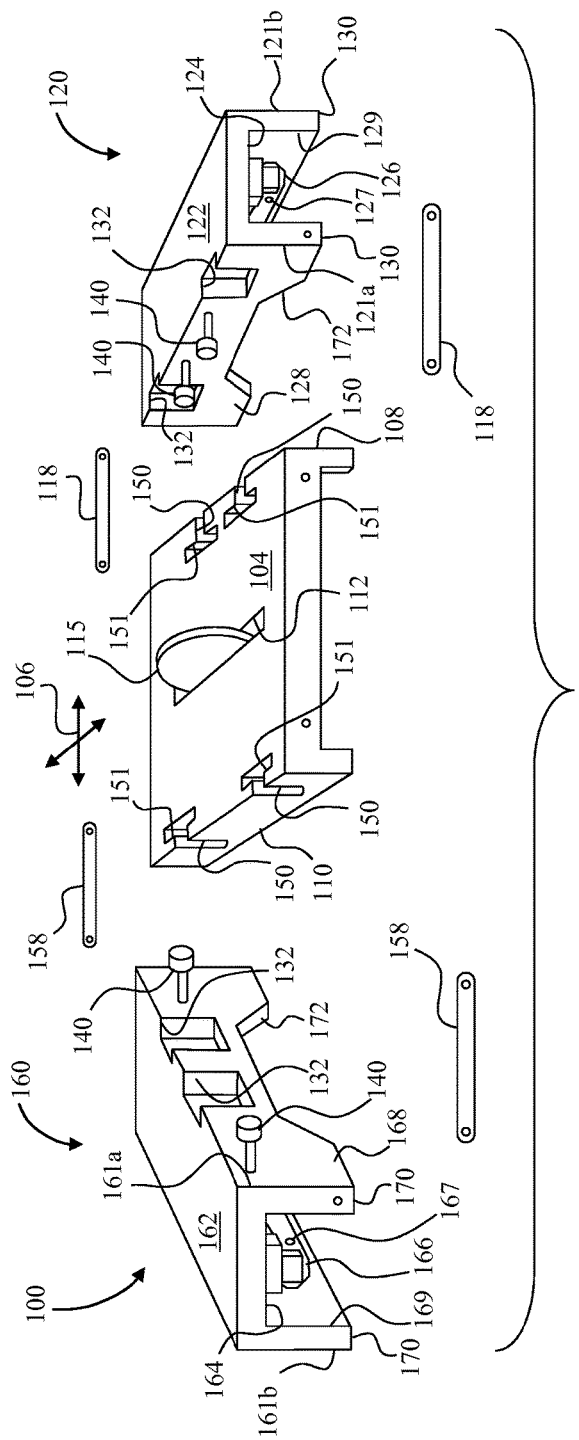
FIG. 2 depicts an exploded perspective view of the table saw assembly of FIG. 1 including slots on the base portion and connecting pins and connecting pin receiving areas on the extensions.

Referring again to FIG. 1, the base portion 102 includes a base work piece support surface 104 defining a support plane 106. As shown in FIG. 2, a saw blade opening 112 is defined in the base work piece support surface 104. The saw blade opening 112 passes through the base portion 102 perpendicularly to the support plane 106. In the embodiment shown in FIG. 2, the saw blade opening 112 is positioned in the center of the base portion 102. It is understood, however, that alternative embodiments of the table saw assembly 100 may include saw blade openings 112 positioned other than in the center of the base portion 102 in order to create more work piece support to the right or the left of the saw blade opening 112 as desired.

Referring again to FIG. 1, the saw blade assembly 114 includes a saw blade 115, a blade guard 116 and a motor 117. The motor 117 may be in the form of any typical motor. In the embodiment shown in FIG. 1, the motor 117 extends outwardly relative to the saw blade 115 toward one side. It is understood, however, that the motor 117 may also be aligned with the saw blade 115 such that the motor 117 does not extend beyond the support frame 101. The saw blade assembly 114 may be of any desired type such as those disclosed in the '795 Application or the '347 Application. The saw blade 115 is positioned to extend upwardly through the saw blade opening 112 of the base portion 102. The blade guard 116 is configured to shield a portion of the saw blade 115 as is well known in the art.

Figure 3:
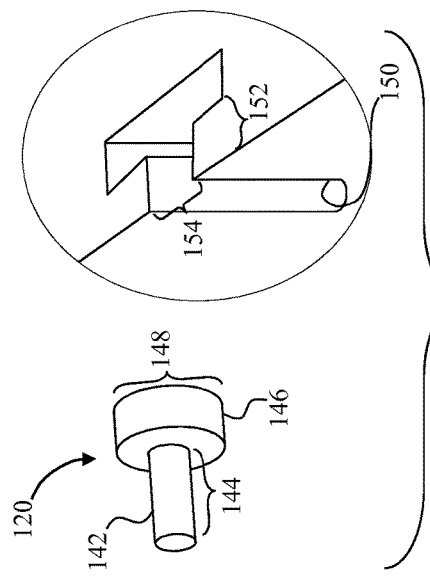
FIG. 3 depicts an exploded perspective view of the slot and connecting pin shown in FIG. 2.

Referring now to FIG. 2, the base portion 102 also includes a lateral support surface 108 and a lateral support surface 110 opposite lateral support surface 108. The lateral support surfaces 108, 110 in this embodiment are perpendicular to the support plane 106 and parallel to the saw blade opening 112. The lateral support surfaces 108, 110 define slots 150 spaced apart from one another and extending inwardly from the lateral support surfaces 108, 110. As shown in more detail in FIG. 3, each slot 150 has a slot wall depth 152 and a slot width 154. This embodiment includes two slots 150 on each of the lateral support surfaces 108, 110. It is understood, however, that alternative embodiments could include more or fewer slots 150.

As shown in FIG. 2, extension 120 includes an extension work piece support surface 122 which is parallel to the support plane 106 when the table saw assembly 100 is in the configuration of FIG. 1. The extension 120 includes a lower surface 124 opposite the extension work piece support surface 122. The extension 120 also includes sidewalls 121a and 121b which extend downwardly from the extension work piece support surface 122 to a lower surface 130 opposite the extension work piece support surface 122. Lower surface 124 and sidewalls 121a and 121b form an extension cavity 129 below the extension work piece support surface 122. The extension 120 includes a support leg 126 coupled to the lower surface 124 and provided within the extension cavity 129.

The extension 160 is identical to extension 120 and is provided on the opposite side of the base portion 102. The extension 160 includes an extension work piece support surface 162, configured and arranged in the same way as described above with reference to extension work piece support surface 122. The extension 160 includes a lower surface 164 opposite the extension work piece support surface 162. The extension 160 also includes sidewalls 161a and 161b which extend downwardly from the extension work piece support surface 162 to a lower surface 170 opposite the extension work piece support surface 162. Lower surface 164 and sidewalls 161a and 161b form an extension cavity 169 below the extension work piece support surface 162. The extension 160 includes a support leg 166 coupled to the lower surface 164 and provided within the extension cavity 169.

The support legs 126 and 166 may be attached to the lower surfaces 124 and 164, respectively, in any desired way such that the support legs 126, 166 may be moved between the deployed configuration (shown in FIG. 1), in which the bottom of the support legs 126, 166 are even with the bottom of the support frame 101, and a stowed configuration (shown in FIG. 2), in which the bottom of the support legs 126, 166 are above the bottom of the support frame 101 and within the extension cavities 129 and 169, respectively. For example, the support legs 126, 166 may be pivotably attached to the lower surfaces 124, 164 with support leg hinges 127, 167, respectively, so that the support legs 126, 166 pivot between the deployed configuration and the stowed configuration. In the embodiment shown in FIG. 1, the support legs 126, 166 each consist of one piece pivotably connected to the extensions 120, 160. It is understood, however, that alternative embodiments of the table saw assembly 100 may include support legs 126, 166 consisting of multiple pieces which are pivotably connected to one another such that the support legs 126, 166 can be folded upon themselves and stored in the extension cavities 129, 169 (shown in FIG. 2).

In an alternative embodiment, the support legs 126, 166 may include telescoping mechanisms, like that in a radio antenna, for example. The support legs 126, 166 could telescope between the deployed configuration and the stowed configuration rather than pivoting between the deployed configuration and the stowed configuration. In another alternative embodiment, the support legs 126, 166 could be both pivotable and telescoping. The embodiment shown in FIG. 1 depicts one support leg 126 supporting extension 120 and one support leg 160 supporting extension 160. It is understood, however, that alternative embodiments of the table saw assembly 100 may include more than one support leg 126 and more than one support leg 166. Additionally, it is understood that alternative embodiments of the table saw assembly 100 may include one or more support legs 126, 166 on only one of the extensions 120, 160.

In the embodiment of the table saw assembly 100 shown in FIGS. 1 and 2, each extension 120, 160 includes a support leg 126, 166. It is understood, however, that alternative embodiments of the table saw assembly 100 may not require support legs 126, 166 to be included on the extensions 120, 160. For example, the support legs 126, 166 may be included on the support frame 101 and pivot or extend to support the extensions 120, 160 as needed. Additionally, the table saw assembly 100 may not require any support legs but instead include other structures to provide adequate support to the extensions 120, 160.

The extensions 120 and 160 further include connecting pins 140 extending perpendicularly from the lateral support surfaces 128 and 168, respectively. The connecting pins 140 are spaced apart from one another and extend in a direction parallel to the support plane 106. As shown in more detail in FIG. 3, each connecting pin 140 includes a shaft 142 having a shaft length 144 and a head 146 having a head diameter 148. This embodiment includes two connecting pins 140 on each lateral support surface 128, 168. It is understood, however, that alternative embodiments could include more or fewer connecting pins 140.

Returning to FIG. 2, the extensions 120 and 160 further include connecting pin receiving areas 132 extending inwardly from the lateral support surface 128 and 168, respectively. The connecting pin receiving areas 132 on the extension 120 open toward the extension work piece support surface 122 and the lateral support surface 128. The connecting pin receiving areas 132 on the extension 160 open toward the extension work piece support surface 162 and the lateral support surface 168. The connecting pin receiving areas 132 are spaced apart from one another and are sized and shaped to loosely receive connecting pins 140. This embodiment includes two connecting pin receiving areas 132 on each lateral support surface 128, 168. It is understood, however, that alternative embodiments could include more or fewer connecting pin receiving areas 132 to correspond to the number of connecting pins 140 provided.

The extensions 120 and 160 further include saw blade cut-outs 172. The saw blade cut-outs 172 extend upwardly from the lower surfaces 130, 170 and extend through the lateral support surfaces 128, 168 to the extension cavities 129, 169. The saw blade cut-outs 172 are sized and configured such that a portion of the saw blade 115 or the saw blade guard 116 can pass through the saw blade cut-outs 172 to the extension cavities 129, 169 unobstructed by the lateral support surfaces 128, 168.

In operation, the table saw assembly 100 is used to cut a work piece when the extensions 120, 160 are in a deployed configuration (shown in FIG. 1). As shown in FIG. 1, when the table saw assembly 100 is in the deployed configuration, the extension work piece support surfaces 122, 162 are coplanar with the base work support surface 104 such that a work piece may be supported atop all three support surfaces. The support legs 126, 166 support the extensions 120, 160, respectively. Thus, the support legs 126, 166 are configured such that the extension work piece support surfaces 122, 166 are coplanar with the base work piece support surface 104 and the bottoms of the support legs 126, 166 are even with the bottom of the support frame 101. Additionally, the lateral support surface 108 on the base portion 102 is in opposition to and is abutting the lateral support surface 128 on the extension 120 and the lateral support surface 110 on the base portion 102 is in opposition to and is abutting the lateral support surface 168 on the extension 160.

The slots 150 defined in the base portion 102 and the connecting pins 140 on the extensions 120, 160 are configured and arranged such that when the table saw assembly 100 is in the deployed configuration, the connecting pins 140 on the extensions 120, 160 fit into the slots 150 on the base portion 102. The slots 150 and connecting pins 140 are sized such that there is a tight fit between the slots 150 and connecting pins 140. Accordingly, in some embodiments the connecting pins 140 and slots 150 may be configured to support the extensions 120, 160 without the need for any other support.

The slots 150 and the connecting pins 140 are positioned such that when the table saw assembly 100 is in the deployed configuration, the lateral support surface 128 abuts the lateral support surface 108, the shafts 142 of the connecting pins 140 extend into the slots 150 and the heads 146 abut opposing surfaces 151 of the slots 150 opposite the lateral support surface 108 in which the slots 150 are defined. The shaft length 144 is slightly larger than the slot wall depth 152 such that the shaft 142, and not the head 146, is received within the slot 150. The head diameter 148 is slightly larger than the slot width 154 such that the head 146 does not pass through the slot 150 in a direction parallel to the support plane 106.

Figure 4A:
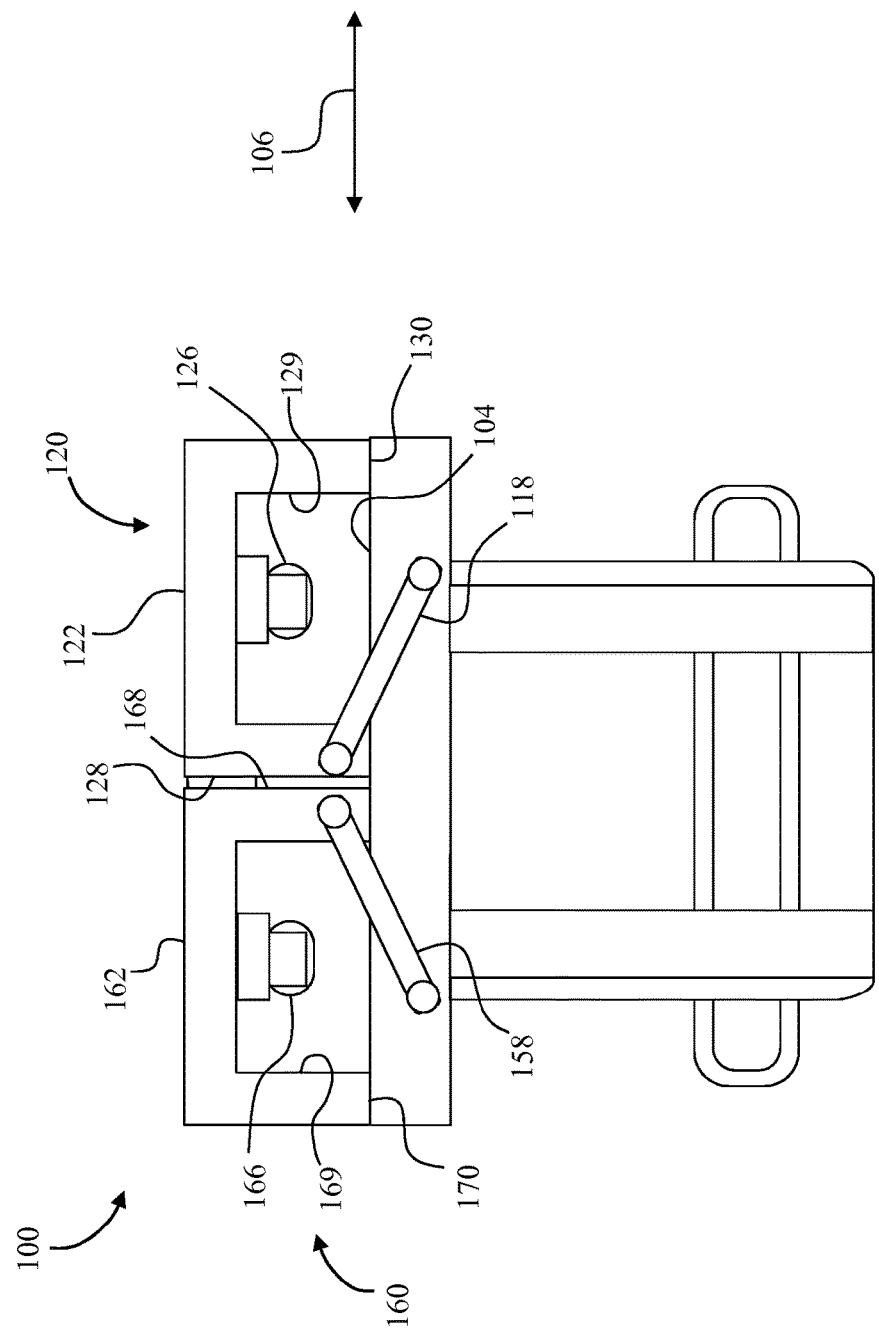
FIG. 4A depicts a front elevational view of the table saw assembly of FIG. 1 wherein the extensions are pivoted relative to the base portion and are in a stowed configuration creating a saw blade cavity.

As shown in FIG. 4A, when the table saw assembly 100 is in a stowed configuration, the extension work piece support surfaces 122, 162 and the lateral support surfaces 128, 168 are located above the support plane 106 and the lower surfaces 130, 170 rest on the base work support surface 104. Additionally, when the table saw assembly 100 is in the stowed configuration, the support legs 126, 166 are stowed in the extension cavities 129, 169, respectively, such that the support legs 126, 166 do not prevent positioning of the extensions 120, 160 in the stowed configuration. Additionally, when the table saw assembly 100 is in the stowed configuration, the lateral support surface 128 and the lateral support surface 168 are in opposition to and abutting one another. The saw blade cut-outs 172 (shown in FIG. 2) accommodate the saw blade 115 (shown in FIG. 2) and the saw blade guard 116 such that they do not need to be removed.

The connecting pin receiving areas 132 defined in the extensions 120, 160 and the connecting pins 140 on the extensions 120, 160 are configured and arranged such that when the table saw assembly 100 is in the stowed configuration, the connecting pins 140 on the extension 120 fit into the connecting pin receiving areas 132 on the extension 160. Likewise, the connecting pins 140 on the extension 160 fit into the connecting pin receiving areas 132 on the extension 120. The connecting pins 140 and connecting pin receiving areas 132 are sized such that there is a loose fit between the connecting pins 140 and the connecting pin receiving areas 132. The connecting pins 140 and the connecting pin receiving areas 132 are positioned such that when the table saw assembly 100 is in the stowed configuration, the connecting pins 140 extend into the connecting pin receiving areas 132, enabling the lateral support surface 128 to abut the lateral support surface 168 without interference.

Figure 4B:
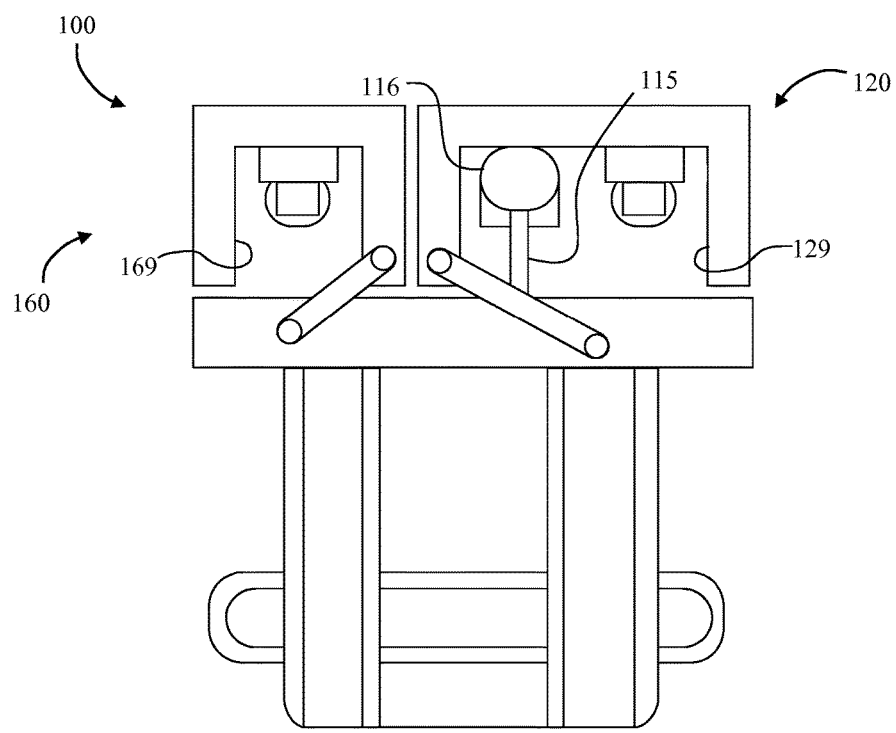
FIG. 4B depicts an alternative embodiment of the table saw assembly of FIG. 4A wherein the extensions are not symmetrical and are in a stowed configuration.

FIG. 4B depicts an alternative embodiment of table saw assembly 100 wherein the extensions 120, 160 are of unequal size. The arrangement of the extensions 120, 160 in this embodiment allow the table saw assembly to have more work piece support to the left or the right of the saw blade 115 as desired. Additionally, when this embodiment of the table saw assembly 100 is in the stowed configuration, the saw blade 115 and saw blade guard 116 are received within the extension cavity of the larger of extension. In the embodiment shown in FIG. 4B, the saw blade 115 and saw blade guard 116 are received within extension cavity 129 of extension 120.

Returning to FIGS. 1 and 4A, the table saw assembly 100 is movable from the stowed configuration to the deployed configuration by pivoting the extensions 120, 160 relative to the base portion 102 about pivot assemblies 118, 158, respectively, until the extensions 120, 160 are no longer positioned above the support plane 106. First, the lateral support surfaces 128, 168 are separated from one another and the lower surfaces 130, 170 are removed from the top of the base work piece support surface 104 by pivoting the extensions 120, 160. Pivoting the extensions 120, 160 also removes the saw blade 115 from within the saw blade cut-outs 172 and removes the connecting pins 140 from within the connecting pin receiving areas 132. Next, the support legs 126, 166, are removed from the extension cavities 129, 169 and are extended to support extensions 120, 160. As the extensions 120, 160 are further pivoted, the connecting pins 140 are received within the slots 150 in a direction perpendicular to the support plane 106. The extension work piece support surfaces 122, 162 are then substantially coplanar with the base work piece support surface 104, the lateral support surface 128 abuts the lateral support surface 108 and the lateral support surface 168 abuts the lateral support surface 110. When the table saw assembly 100 is no longer needed to cut a work piece, the table saw assembly 100 can be changed from the deployed configuration to the stowed configuration by reversing the process described above.

FIG. 5 depicts an exploded perspective view of a table saw assembly 200. The table saw assembly 200 is similar to the table saw assembly 100, including a base portion 202, an extension 220 and an extension 260, wherein the extensions 220, 260 are pivotable relative to the base portion 202. The base portion 202, extension 220 and extension 260 are configured and arranged in substantially the same way as table saw assembly 100, including the same features and relationships. In contrast to the table saw assembly 100, however, the table saw assembly 200 includes connecting pins 240 provided on the base portion 202 and defines slots 250 in the extensions 220, 260. The embodiment of FIG. 5 includes two connecting pins 240 and two slots 250. It is understood, however, that alternative embodiments of the table saw assembly 200 may include more or fewer than two connecting pins 240 and slots 250.

The relative dimensions of the connecting pins 240 and the slots 250 may be substantially the same as the relative dimensions of the connecting pins 140 and the slots 150 of table saw assembly 100. Accordingly, when the table saw assembly 200 is in use, the relationships between the connecting pins 240 and slots 250 may be substantially the same as described above with reference to the connecting pins 140 and the slots 150. When the table saw assembly 200 is in the deployed configuration, the slots 250 of the extensions 220, 260 fit over the connecting pins 240 of the base portion 202.

The lateral surfaces 228, 268 of the extensions 220, 260 do not include protruding connecting pins 240. Thus, when the table saw assembly 200 is in the stored configuration, lateral surfaces 228, 268 are in opposition to and abutting one another without interference. Accordingly, table saw assembly 200 does not require connecting pin receiving areas like those provided in table saw assembly 100.

Figure 6:
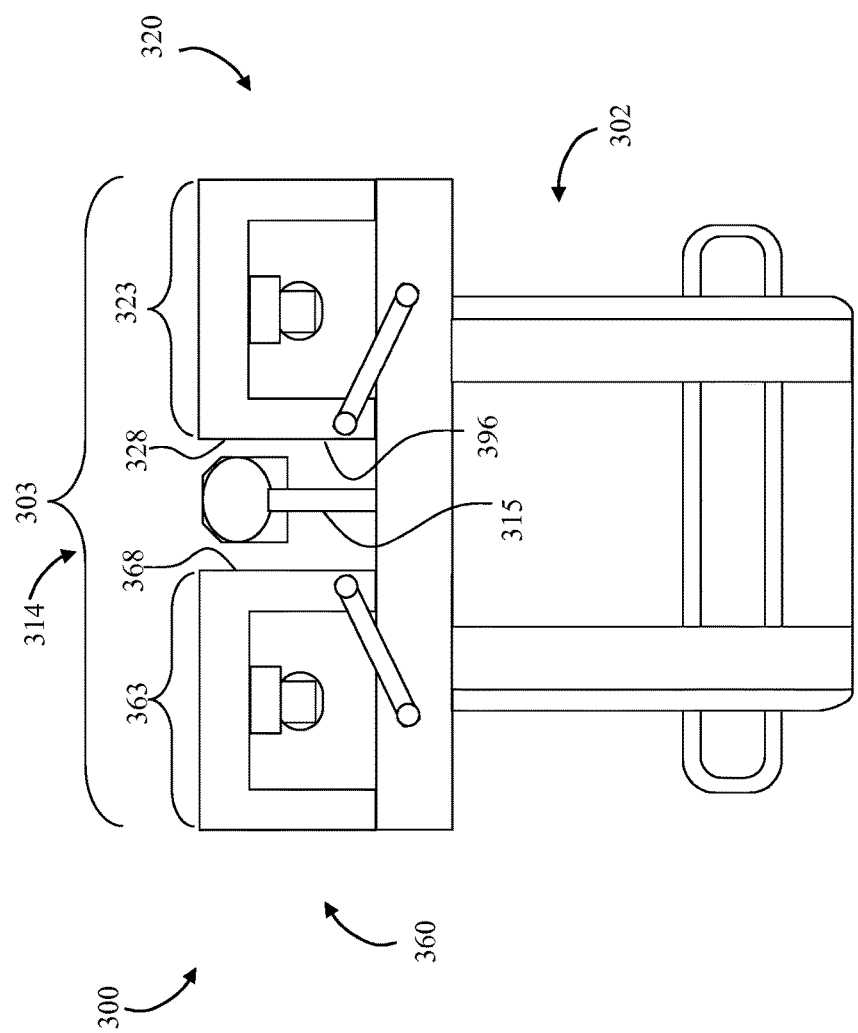
FIG. 6 depicts a front elevational view of an alternative embodiment of a table saw assembly in a stowed configuration creating a saw blade cavity.

FIG. 6 depicts a front elevational view of a table saw assembly 300. The table saw assembly 300 is similar to the table saw assembly 100, including a base portion 302, an extension 320 and an extension 360, wherein the extensions 320, 360 are pivotable relative to the base portion 302. The base portion 302 and the extensions 320, 360 are configured and arranged in substantially the same way as the base portion 102 and the extensions 120, 160 of table saw assembly 100, including the same features and relationships. In contrast to the table saw assembly 100, however, the relative sizes of the extensions 320, 360 and the base portion 302 of the table saw assembly 300 are such that the extensions 320, 360 do not abut when the table saw assembly 300 is in the stowed configuration.

In particular, the base portion 302 defines a base length 303 and the extensions 320, 360 define extension lengths 323, 363, respectively. The base length 303 is greater than the sum of the extension lengths 323, 363. When the table saw assembly 300 is in the stowed configuration (as shown in FIG. 6), the extensions 320, 360 are arranged such that the lateral support surfaces 328, 368 are in opposition to and spaced apart from one another. Thus, the lateral support surfaces 328, 368 do not abut, but instead define a saw blade cavity 396. The saw blade 315 of the saw blade assembly 314 is positioned at least partially within the saw blade cavity 396 when the extensions 320, 360 are in the stowed configuration. When the saw blade 315 is positioned within the saw blade cavity 396, it is possible to store or move the table saw assembly 300 without removing or adjusting the saw blade 315 or the blade guard 316 because the extensions 320, 360 protect the saw blade 315 and blade guard 316 from damage and protect the user from injury.

The table saw assembly 300 may not require connection pin receiving cavities like those described with reference to table saw assembly 100, because the extensions 320, 360 do not abut and connection pins do not interfere with moving the extensions 320, 360 to the stowed configuration. Additionally, the table saw assembly 300 may not require saw blade cut-outs like those described with reference to table saw assembly 100, because the saw blade 315 extends into the saw blade cavity 396 and the lateral support surfaces 328, 368 do not interfere with the saw blade 315.

In the embodiments described above, the base portions of the table saw assemblies 100, 200 and 300 include only connecting pins or only slots. It is understood, however, that in alternative embodiments, the base portion may include a combination of connecting pins and slots. For example, the base portion may include connecting pins on one of the lateral support surfaces and slots on the other of the lateral support surfaces. The extensions are configured to include structures that correspond to those provided on the base portion.

Table saw assemblies 100, 200 and 300 provide a user with a foldable tabletop such that the table saw assemblies can support work pieces on extension work piece support surfaces in addition to the base work piece support surface. The additional work piece support surfaces allow a user to support larger work pieces on the table saw assemblies. Additionally, the extensions can be folded on top of the base portions. When the extensions are folded on top of the base portions, such that the table saw assemblies are in the stowed configurations, the footprints of the table saw assemblies are substantially identical in size and shape the footprints of the base portions alone. This allows the table saw assemblies to be stored in footprints as small as the base portions without sacrificing the additional work piece support surfaces. Finally, the table saw assemblies which include saw blade cut-outs or saw blade cavities provide the above advantages as well as eliminating the need to move or adjust saw blades between uses of the table saw assemblies, saving time and effort.

Figure 7:
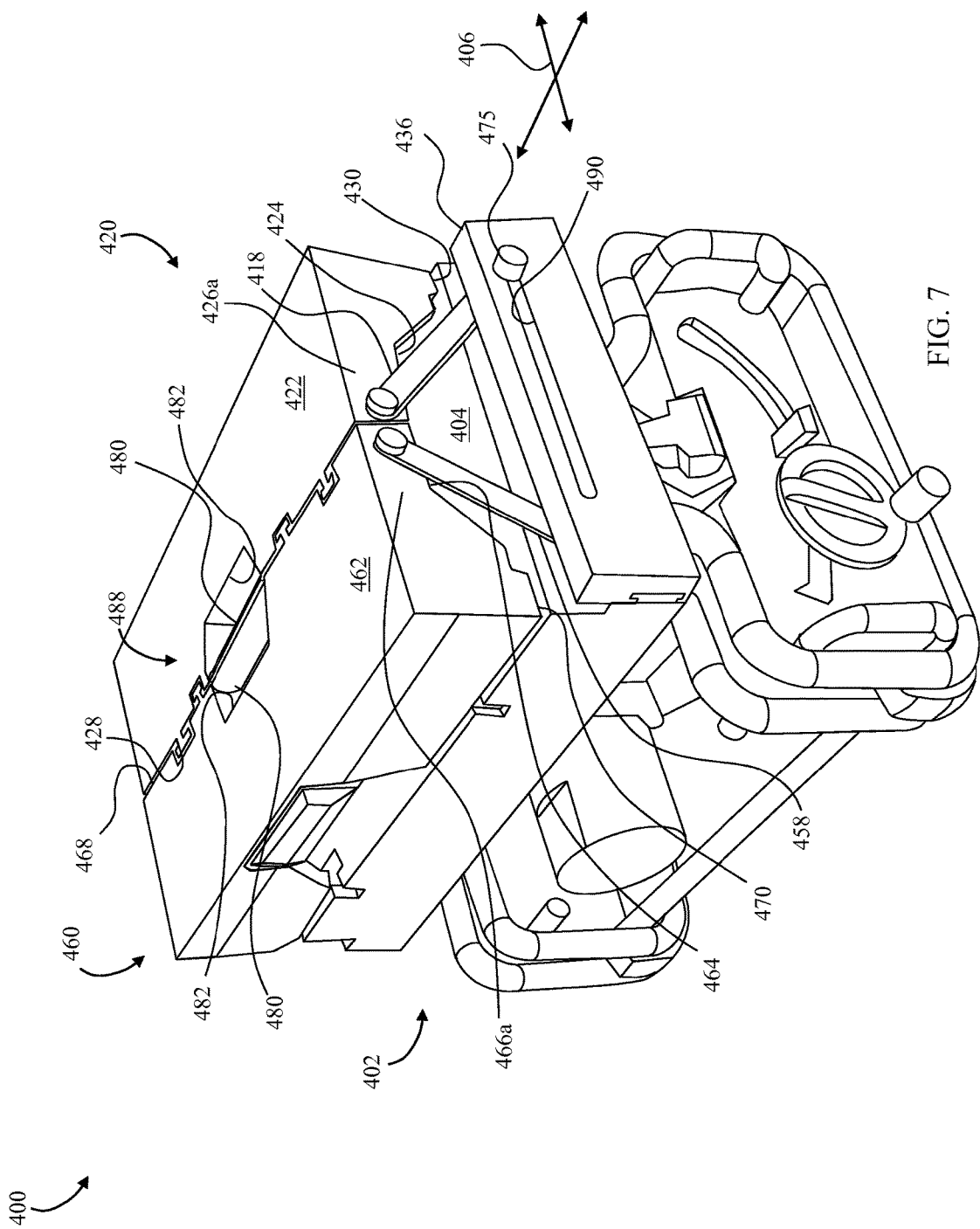
FIG. 7 depicts a perspective view of another embodiment of a table saw assembly having a handle in a stowed configuration.
Figure 11:
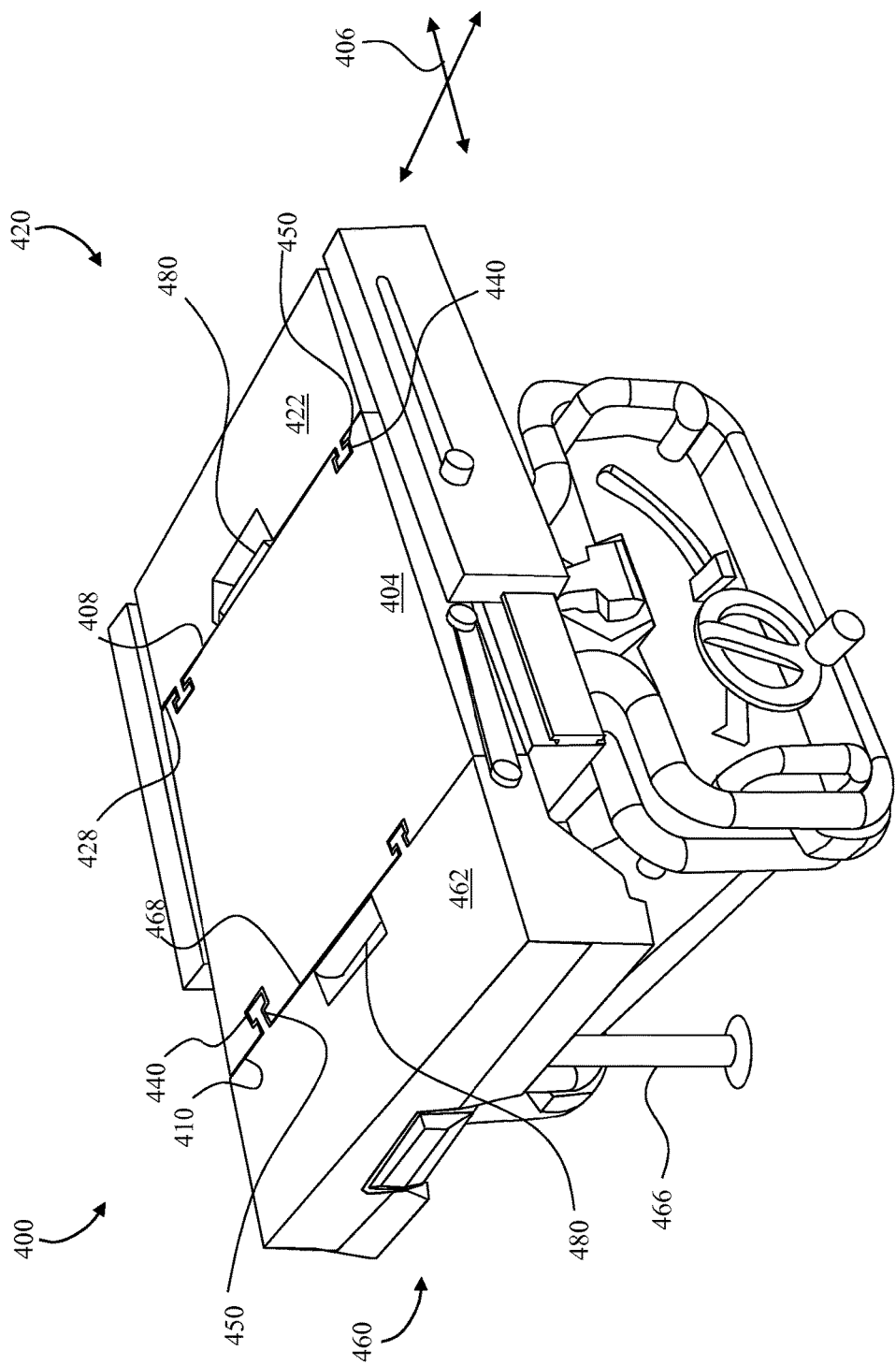
FIG. 11 depicts a perspective view of the table saw assembly of FIG. 7 in a deployed configuration.

Referring now to FIG. 7, a table saw assembly 400 is depicted. The table saw assembly 400 is similar to the table saw assembly 100, including a base portion 402, an extension 420 and an extension 460, wherein the extensions 420, 460 are pivotable relative to the base portion 402. The base portion 402 includes a base work piece support surface 404 defining a support plane 406, a lateral support surface 408 and a lateral support surface 410. The lateral support surface 408 and lateral support surface 410 are opposite one another and both are perpendicular to the base work piece support surface 404 and the support plane 406. The table saw assembly 400 also includes a saw blade opening 412 defined in the base work piece support surface 404. As shown in FIG. 11, the lateral support surfaces 408, 410 define slots 450 spaced apart from one another and extending inwardly from the lateral support surfaces 408, 410. The slots 450 are dimensioned, arranged and configured in substantially the same way as slots 150 of table assembly 100.

Figure 8A:
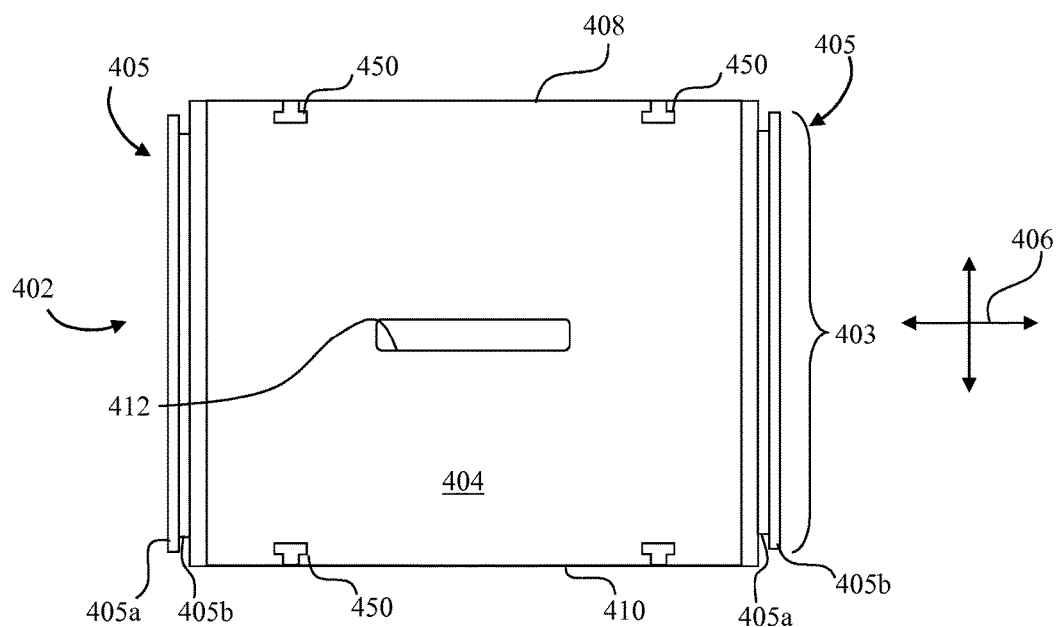
FIG. 8A depicts a top elevational view of the base portion of FIG. 7.
Figure 8B:
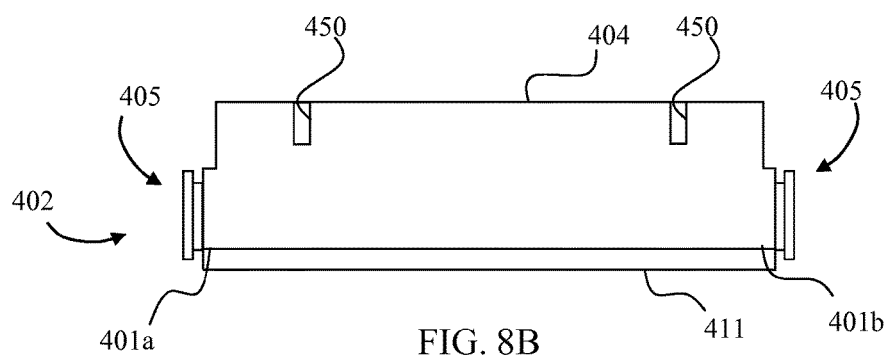
FIG. 8B depicts a right side elevational view of the base portion of FIG. 7.
Figure 8C:
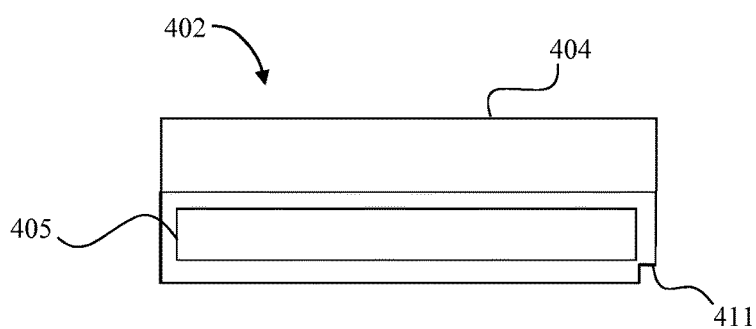
FIG. 8C depicts a front elevational view of the base portion of FIG. 7.

Returning to FIG. 7, the table saw assembly 400 differs from the table saw assembly 100, because the base portion 402 includes a rail 405 and the table saw assembly 400 includes a sliding support assembly 436. As shown in FIG. 8B, the base portion 402 also includes a front right portion 401a, a back right portion 401b, a rail 405 on each of the front and back of the base portion 402, and base cut-outs 411 (also shown in FIG. 8C). The base cut-outs 411 extend into the front and right facing sides of the front right portion 401a and into the back and right facing sides of the back right portion 401b of the base portion 402. As shown in FIGS. 8A and 8B, the rails 405 extend outwardly from the base portion 402 and extend along a length 403 (shown in FIG. 8A) of the base portion 402. Each rail 405 includes a neck portion 405a, coupled to the base portion 402, and a boss portion 405b, coupled to the neck portion 405a. The neck portions 405a are shorter in length than the boss portions 405b (shown in FIGS. 8A and 8C) and shorter in height than the boss portions 405b (shown in FIG. 8B). The rails 405 connect the base portion 402 to the sliding support assembly 436 shown in FIGS. 9A and 9B.

Figure 9A:
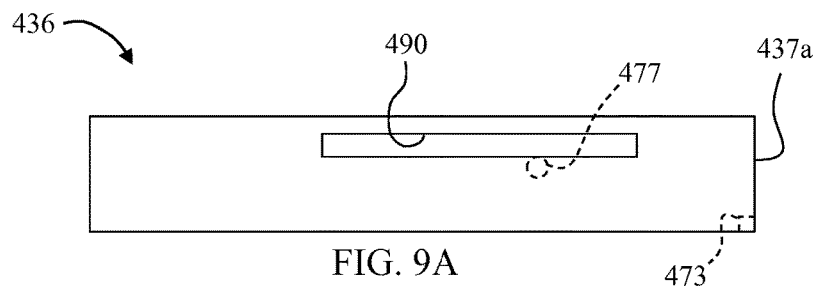
FIG. 9A depicts a front elevational view of the sliding support member of the embodiment of the table saw assembly of FIG. 7.
Figure 9B:
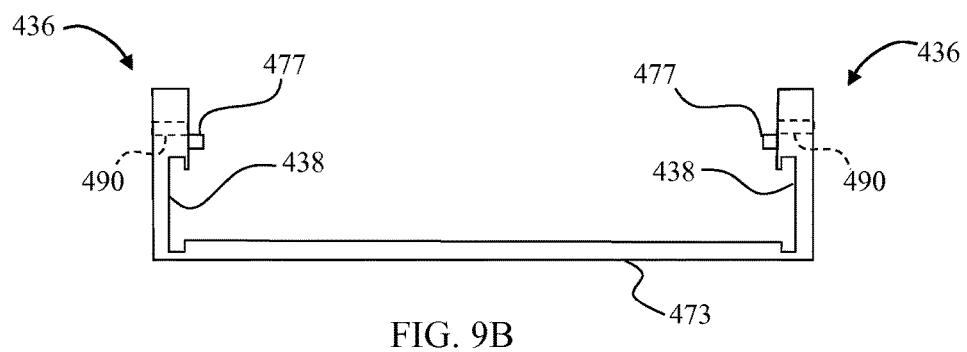
FIG. 9B depicts a right side elevational view of the sliding support member of the embodiment of the table saw assembly of FIG. 7.

FIG. 9A shows a front elevational view and FIG. 9B shows a right side elevational view of a sliding support assembly 436. The sliding support assembly 436 includes a bottom right portion 437a, rail cavities 438, sliding slots 490, an extension support bar 473 and pivot assembly support bars 477. As shown in FIG. 9A, the sliding slots 490 extend through the sliding support assembly 436. As shown in FIG. 9B, the rail cavities 438 are sized and shaped to receive the rails 405 provided on the base portion 402 (shown in FIGS. 8A-8B). The pivot assembly support bars 477 extend outwardly from the back of the bottom right portion 437a of the sliding support assembly 436. The extension support bar 473 is sized and configured to be received within the base cut-outs 411 provided on the front right portion 401a and the back right portion 401b of the base portion 402 (shown in FIG. 8A). In the embodiment shown in FIGS. 9A and 9B, the sliding support assembly 436 is one piece with a front side and a back side connected by the extension support bar 473. It is understood, however, that alternative embodiments of table saw assembly 400 may include sliding support assemblies 436 wherein the front side and back side are not connected by the extension support bar 473 such that the front side and back side are independently movable. In the alternative embodiments, the front side and back side of the sliding support assemblies 436 each include extension support bars 473 which are not connected, but are sized and configured to be received within the base cut-outs 411 provided on the front right portion 401a and the back right portion 401b of the base portion 402 (shown in FIG. 8A).

The sliding support assembly 436 is slidably coupled to the base portion 402. Referring to FIGS. 8A and 9B, the rails 405 of the base portion 402 fit slidably within the rail cavities 438 of the sliding support assembly 436. Thus, the sliding support assembly 436 can slide to the right or the left relative to the base portion 402 on the rails 405 and the sliding support assembly 436 is movable along the support plane 406.

Figure 10A:
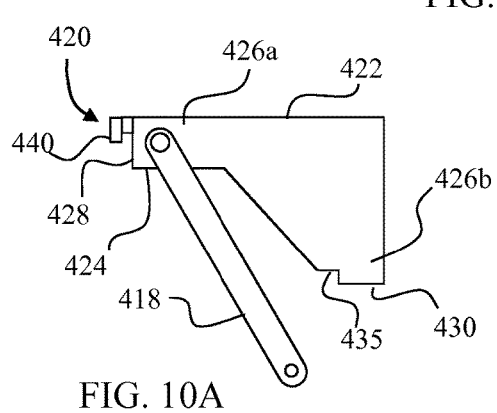
FIG. 10A depicts a front elevational view of an extension of the embodiment of the table saw assembly of FIG. 7.
Figure 10C:
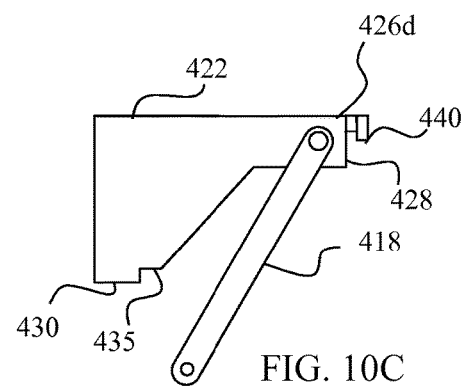
FIG. 10C depicts a back elevational view of an extension of the embodiment of the table saw assembly of FIG. 7.
Figure 10B:
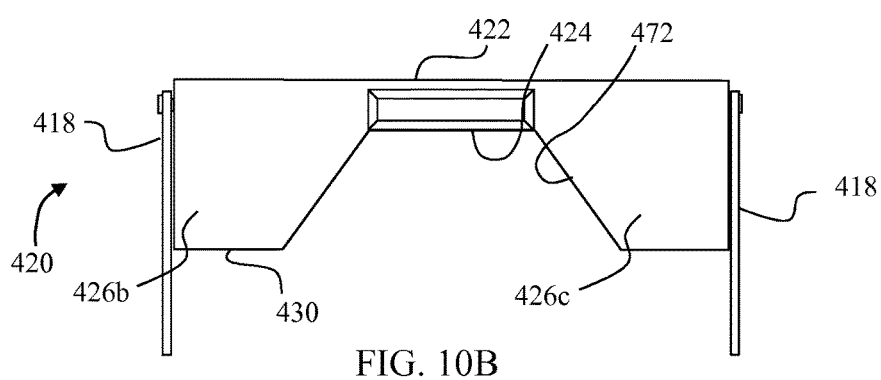
FIG. 10B depicts a right side elevational view of an extension of the embodiment of the table saw assembly of FIG. 7.

FIG. 10A shows a front elevational view of the extension 420 and FIG. 10B shows a right side elevational view of the extension 420. The extension 420 includes an extension work piece support surface 422 which is substantially similar to the extension work piece support surface 122 described above with reference to table saw assembly 100. The extension work piece support surface 422 is parallel to the support plane 406 in the configuration of FIG. 7A. The extension 420 also includes a lower surface 424 opposite the extension work piece support surface 422. The extension 420 includes a lateral surface 428 perpendicular to the extension work piece support surface 422. The extension 420 further includes a lower surface 430 opposite the extension work piece support surface 422. The lower surface 430 is lower than the lower surface 424. The extension 420 also includes a saw blade cut-out 472 extending upwardly from the lower surface 430. The saw blade cut-out 472 is configured and arranged in the same manner as described above with reference to saw blade cut-out 172 of table saw assembly 100.

The extension 420 further includes a front left portion 426a, a front right leg 426b, a back right leg 426c, a back left portion (shown in FIG. 10C) a support bar cavity 435, and pivot assemblies 418. As shown in FIG. 10A, the support bar cavity 435 extends into the front right leg 426b. The support bar cavity 435 is sized and configured to receive the extension support bar 473 provided on the sliding support assembly 436 (shown in FIG. 9B). A support bar cavity 435 is also provided on the back right leg 426c. As shown in FIG. 10A, a pivot assembly 418 is coupled to the front left portion 426a of the extension 420. A pivot assembly 418 is also coupled to the back left portion 426d (shown in FIG. 10C). As shown in FIGS. 10B and 10C, the pivot assemblies 418 extend outwardly from the front left portion 426a and back left portion 426d of the extension 420 and are pivotable relative to the front left portion 426a and back left portion 426d of the extension 420. Each of the pivot assemblies 418 includes a locking member 475 (shown in FIG. 7) at the end opposite the front left portion 426a and back left portion 426d.

Continuing with FIG. 7, the pivot assemblies 418 are pivotably coupled to the front left portion 426a and the back left portion 426d of the extension 420. The pivot assemblies 418 are also pivotably coupled to the sliding support assembly 436 through the sliding slots 490. Thus, the pivot assemblies 418 pivotably couple the extension 420 to the sliding support assembly 436. The locking members 475 couple the extension 420 to the sliding support assembly 436 such that they can be locked so that the pivot assemblies 418 will not pivot relative to the sliding support assembly 436 and the sliding support assembly 436 will not slide relative to the base portion 402. Alternatively, the locking members 475 can be unlocked so that the pivot assemblies 418 will pivot relative to the sliding support assembly 436 and the sliding support assembly 436 will slide relative to the base portion 402.

As shown in FIG. 7, the extension 460 is substantially the same as, and inverted relative to, the extension 420, including an extension work piece support surface 462, a lower surface 464, a lateral support surface 468, a lower surface 470, and pivot assemblies 458 coupled to a front right portion 466a and a back right portion. The extension 460 also includes a saw blade cut-out identical to that of extension 420. The extension 460 differs from the extension 420, however, because the extension 460 does not include a support bar cavity like that provided on extension 460. Additionally, the pivot assembly 458 couples the extension 460 to the base portion 402 such that the extension 460 may be pivoted relative to the base portion 402. In this embodiment, the pivot assembly 458 is not coupled to a sliding support assembly.

Referring again to FIG. 7, extensions 420, 460 further include handle portions 480 and handle openings 482. The handle openings 482 are provided on and open to the extension work piece support surfaces 422, 462. The handle portions 480 are configured such that they extend within the handle openings 482.

Referring to FIG. 11, the extensions 420, 460 further include support legs 426, 466 coupled to the lower surfaces 424, 464, respectively. The support legs 426, 466 may be configured and arranged in the same manner as described above with reference to table saw assemblies 100, 200 and 300. In this embodiment, only one support leg 426 and one support leg 466 is shown for each extension 420, 460. It is understood, however, that alternative embodiments may include more or fewer than one support leg 426 coupled to extension 420 and more or fewer than one support leg 466 coupled to extension 460.

The extensions 420, 460 further include connecting pins 440 extending perpendicularly from the lateral support surfaces 428, 468. The connecting pins 440 are spaced apart from one another and extend in a direction parallel to the support plane 460. The connecting pins 440 are dimensioned, arranged and configured in substantially the same way as connecting pins 140 of table assembly 100. Similarly, the extensions 420, 460 further include connecting pin receiving areas (not shown). The connecting pin receiving areas are dimensioned, arranged and configured in substantially the same way as connecting pin receiving areas 132 of table saw assembly 100.

In operation, the table saw assembly 400 is used to cut a work piece when the extensions 420, 460 are in a deployed configuration (shown in FIG. 11). As shown in FIG. 11, when the table saw assembly 400 is in the deployed configuration, the extension work piece support surfaces 422, 462 are coplanar with the base work piece support surface 404 such that a work piece may be supported atop all three support surfaces. The support legs 426, 466 support the extensions 420, 460, respectively, in substantially the same way as described above with reference to table saw assembly 100. Additionally, the lateral support surface 408 on the base portion 402 is in opposition to and is abutting the lateral support surface 428 on the extension 420 and the lateral support surface 110 on the base portion 402 is in opposition to and is abutting the lateral support surface 468 on the extension 460. The connecting pins 440 are received in the slots 450 as described above with reference to the connecting pins 140 and the slots 150 of the table saw assembly 100. Additionally, the pivot assemblies 118 rest on the pivot assembly support bars 477 and the support bar cavities 435 rest on the extension support bar 473.

When the table saw assembly 400 is in the deployed configuration, the handle portions 480 lie below the support plane 406 such that they do not project above a substantially continuous surface formed by the base work piece support surface 404 and the extension work piece support surfaces 422, 462.

As shown in FIG. 7, when the table saw assembly 400 is in a stowed configuration, the extension work piece support surfaces 422, 462 and the lateral support surfaces 428, 468 are located above the support plane 406 and the lower surfaces 430, 470 rest on the base work piece support surface 404. Additionally, when the table saw assembly 400 is in the stowed configuration, the support legs 426, 466 are stowed beneath the extension 420, 460 in the same manner as described above with reference to support legs 126, 166 of table saw assembly 100. Additionally, when the table saw assembly 400 is in the stowed configuration, the connecting pins 440 are received within the connecting pin receiving areas (as described above with reference to table saw assembly 100) allowing the lateral support surface 428 and the lateral support surface 468 to be in opposition to and abutting one another. The saw blade cut-outs 472 (shown in FIG. 10B) accommodate the saw blade such that it does not need to be removed.

When the table saw assembly 400 is in the stowed configuration, the handle portions 480 abut one another to form a handle 488, and the handle openings 482 on the extension work piece support surfaces 422, 462 abut one another as well. The handle 488, comprised of the combined handle portions 480 is accessible by a user through the combined handle openings 482.

The table saw assembly 400 is movable from the stowed configuration to the deployed configuration by pivoting the extension 420 relative to the sliding support assembly 436 and pivoting the extension 460 relative to the base portion 402. The extensions 420, 460 are pivoted about pivot assemblies 418, 458, respectively, until the extensions 420, 460 are no longer positioned above the support plane 406. First, the locking members 475 are unlocked such that the sliding support assembly 436 can move independently of the first extension 420 and the base portion 402. The sliding support assembly 436 slides to the right relative to the base portion 402. The rail cavities 438 (shown in FIG. 9B) of the sliding support assembly 436 slide along the outside of the rails 405 of the base portion 402 allowing the sliding support assembly 436 to slide to the right relative to the base portion 402. The sliding support assembly 436 slides to the right relative to the base portion 402 until the locking members 475 contact the left ends of the sliding slots 490. Because the locking members 475 are unlocked, the extension 420 can then be pivoted about the pivot assemblies 418 relative to the sliding support assembly 436. The lateral support surfaces 428, 468 are separated from one another and the lower surfaces 430, 470 are removed from the top of the base work piece support surface 404 by pivoting the extensions 420, 460.

The extensions 420, 460 are then pivoted relative to the sliding support assembly 436 and the base portion 402, respectively. The extension work piece support surfaces 422, 462 may remain substantially parallel to the base work piece support surface 404 throughout the pivoting motion. Alternatively, the extension work piece support surfaces 422, 462 may rotate such that they are not substantially parallel to the base work piece support surface 404 throughout the pivoting motion. The support legs 426, 466 are deployed to support the extensions 420, 460. The rotation of the pivot assemblies 418 is limited by the contact of the pivot assemblies 418 with the pivot assembly support bars 477 (shown in FIG. 9B) and reception of the extension support bar 473 (shown in FIG. 9B) within the support bar cavities 435 (shown in FIG. 10A) of the extension 420. The rotation of the pivot assemblies 458 is limited by the contact of the lateral support surface 468 of the extension 460 with the lateral support surface 410 of the base portion 402.

Pivoting the extensions 420, 460 also removes the saw blade 415 from within the saw blade cut-outs 472 and removes the connecting pins 440 from within the connecting pin receiving areas 432. The support legs 426, 466, are also extended to support extensions 420, 460. As the extensions 420, 460 are further pivoted, the connecting pins 440 are received within the slots 450 in a direction perpendicular to the support plane 406.

The sliding support assembly 436 is configured to support the extension 420 in the deployed configuration by supporting the support bar cavities 435 on the extension support bar 473. When the pivot assemblies 418 contact the pivot assembly support bars 477 of the sliding support assembly 436, and the extension support bar 473 is received within the support bar cavities 435, the extension work piece surface 422 is coplanar with the base work piece support surface 402, and the table saw assembly 400 is in the deployed configuration. The locking members 475 are then locked to prevent the pivot assemblies 418 from further rotation relative to the sliding support assembly 436 and to prevent the sliding assembly 436 from sliding relative to the base portion 402. Locking the locking members 475 thus retains the position of the extension 420 relative to the sliding support assembly 436 and to the base 402. The extension work piece support surfaces 422, 462 are then substantially coplanar with the base work piece support surface 404, the lateral support surface 428 abuts the lateral support surface 408 and the lateral support surface 468 abuts the lateral support surface 410.

When the table saw assembly 400 is no longer needed to cut a work piece, the table saw assembly 400 can be moved from the deployed configuration to the stowed configuration. The table saw assembly 400 is movable from the deployed configuration toward the stowed configuration by pivoting the extensions 420, 460 about the pivot assemblies 418, 458 and reversing the process described above. First, the locking members 475 are unlocked to allow movement of the pivot assembly 418 relative to the sliding support assembly 436 and movement of the sliding support assembly 436 relative to the base portion 402. The support legs 426, 466 are stowed beneath the extensions 420, 460 to prevent interference with the pivoting motion. Next, as the extensions 420, 460 are pivoted, the connecting pins 440 are removed from the slots 450 in a direction perpendicular to the support plane 406. As the extension 460 pivots about the pivot assemblies 458, the extension work piece support surface 462 may remain substantially parallel to the base work piece support surface 404 throughout the pivoting motion. The rails 405 on the base portion 402 do not interfere with rotation of the extension 460 about the pivot assemblies 458 because, as shown in FIG. 8B, the neck portions 405a of the rails 405 are shorter than the boss portions 405b of the rails 405 and the pivot assemblies 458 can be positioned between the base portion 402 and the boss portions 405b of the rails 405.

The extensions 420, 460 are then positioned above the support plane 406. The saw blade is accommodated within the saw blade cut-outs 472 and the connecting pins 440 are accommodated within the connecting pin receiving areas allowing the lateral support surfaces 428, 468 to contact one another above the base portion 402. Finally, the lower surfaces 430, 470 rest on top of the base work piece support surface 404 and the sliding support assembly 436 slides to the left to its original position on the base portion 402.

Figure 12:
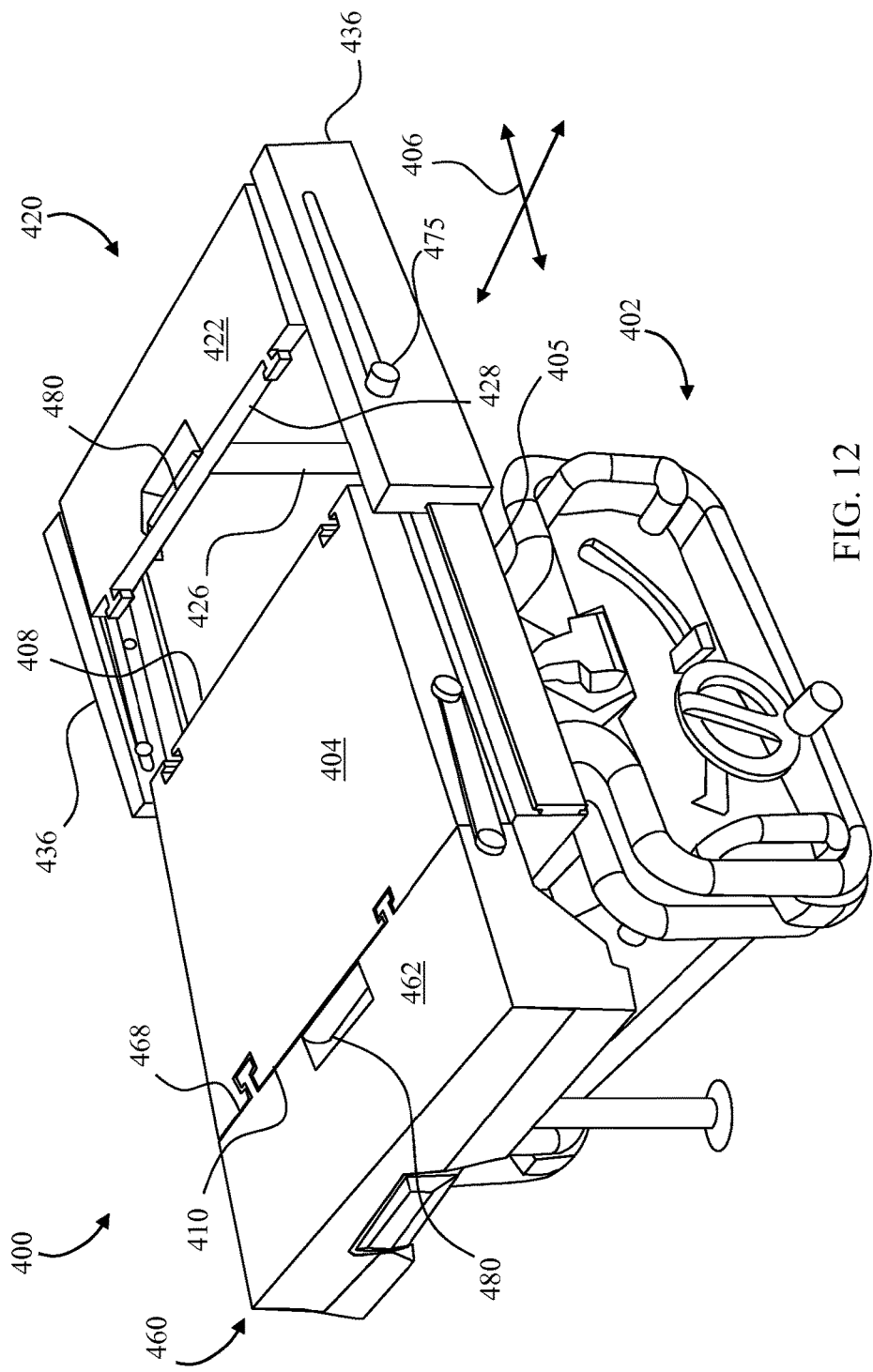
FIG. 12 depicts a perspective view of the table saw assembly of FIG. 7 in an extended deployed configuration.

FIG. 12 shows a perspective view of the table saw assembly 400 in an extended deployed configuration. The extended deployed configuration is substantially similar to the deployed configuration. The extended deployed configuration differs from the deployed configuration because, in the extended deployed configuration, the extension work piece support surface 422 and the extension work piece support surface 462 are coplanar with the base work piece support surface 404 and the extension work piece support surface 422 is spaced apart from the base work piece support surface 404. Additionally, in the extended deployed configuration, the lateral support surface 468 is opposing and abutting the lateral support surface 410 while the lateral support surface 428 is opposing and spaced apart from the lateral support surface 408. When the table saw assembly 400 is in the extended deployed configuration, the handle portions 480 lie below the support plane 406 such that they do not project above a the base work piece support surface 404 and the extension work piece support surfaces 422, 462.

To transition between the deployed configuration shown in FIG. 11 and the extended deployed configuration shown in FIG. 12, the locking members 475 connecting the sliding support assembly 436 and the pivot assemblies 418 are unlocked to allow the sliding support assembly 436 to slide relative to the base portion 402. The extension 420 is lifted slightly to remove the connecting pins 440 on the extension 420 from within the slots 450 on the base portion 402. Once the extension 420 is disengaged from the base portion 402, the sliding support assembly 436 and the extension 420 are now movable together along the support plane 406.

The sliding support assembly 436 then slides to the right along the rails 405 relative to the base portion 402, moving the first extension 420 to a position that is spaced apart from the base portion 402. Thus, the lateral support surface 408 and the lateral support surface 428 are separated while the extension work piece support surface 422 remains coplanar with the base work piece support surface 404. The locking member 475 then locks the sliding support assembly 436 in the spaced apart position relative to the base portion 402, locking the table saw assembly 400 in the extended deployed configuration.

If the table saw assembly 400 is configured such that it is movable into an extended deployed configuration, wherein the extension 420 is movable to a position spaced apart from the base portion 402, the table saw assembly 400 may not include connecting pins or slots on the lateral support surface 428 and the lateral support surface 408 if including connecting pins or slots would impede movement of the table saw assembly 400 into the extended deployed configuration.

In an alternative embodiment, the table saw assembly 400 may include an additional sliding support assembly to support the extension 460 like the sliding support assembly 436 used to support the extension 420 described above. In the same manner as described above with reference to sliding support assembly 436, the additional sliding support assembly may be movably coupled to the base portion 402 such that the extension 460 may then move between the stowed configuration, wherein the extension 460 is stored on top of the base portion 402, the deployed configuration, wherein the extension work piece support surface 462 is coplanar with the base work piece support surface 404, and the extended deployed configuration, wherein the extension work piece support surface 462 is coplanar with and spaced apart from the base work piece support surface 404. These configurations and the movements between them may be substantially the same as described above with reference to the extension sliding support assembly 436 and extension 420.

The embodiments of the table saw assembly 400 provide a user with a foldable tabletop such that the table saw assembly 400 can support work pieces on extension work piece support surfaces 422, 462 in addition to the base work piece support surface 404. The additional work piece support surfaces allow a user to support larger work pieces on the table saw assembly 400. Additionally, the extensions 420, 460 can be positioned on top of the base portion 402. When the extensions 420, 460 are positioned on top of the base portion 402, such that the table saw assembly 400 is in the stowed configuration, a footprint of the table saw assembly 400 is substantially identical in size and shape to a footprint of the base portion 402 alone. Additionally, the embodiments of the table saw assembly 400 which allow the extensions 420, 460 to be spaced apart from the base portion 402 into extended deployed configurations provide even more work piece support surface without requiring any additional storage area. This allows the table saw assembly 400 to be stored in a footprint as small as the base portion 402 without sacrificing the additional work piece support surface. Finally, the embodiments of the table saw assembly 400 which include the handle 488 provide the above advantages as well as an easy way to move the table saw assembly 400 between uses, saving time and effort.

The foregoing detailed description of one or more embodiments of the foldable table top for table saws has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems, or applications. Presently unforeseen or unanticipated alternatives, modifications, variations or improvements therein may be subsequently made by those skilled in the art which are also intended to be encompassed by the appended claims. Therefore, the spirit and scope of any appended claims should not be limited to the description of the embodiments contained herein.

What is claimed is:

1. A table saw assembly, comprising:
a base portion including a base work piece support surface defining a support plane;
a saw blade opening defined in the base work piece support surface;
a saw assembly including a saw blade positionable to extend upwardly through the saw blade opening; and
a first extension including a first extension work piece support surface and a first lower surface opposite the base work piece support surface, the first extension pivotable with respect to the base portion between a first position whereat the first extension work piece support surface is coplanar with the base work piece support surface and a second position whereat the first extension work piece support surface is located above the support plane with the first lower surface located between the base work piece support surface and the first extension work piece support surface.

2. The table saw assembly of claim 1, wherein the first extension further includes:
a support leg pivotably connected to the first lower surface.

3. The table saw assembly of claim 1, wherein:
the base portion includes a first lateral support surface;
the first extension includes a second lateral support surface;
the first lateral support surface is in opposition to the second lateral support surface when the first extension is in the first position; and
the second lateral support surface is located above the support plane when the first extension is in the second position.

4. The table saw assembly of claim 3, further comprising:
a first connecting pin extending from one of the first lateral support surface and the second lateral support surface; and
a first slot defined in the other of the first lateral support surface and the second lateral support surface, wherein:
the first connecting pin includes a first shaft and a first head;
the first shaft has a first shaft length slightly longer than a first slot wall depth;
the first head has a diameter greater than a width of the first slot; and
the first slot and the first connecting pin are positioned such that when the first extension is in the first position the first shaft extends into the first slot and the first head abuts a surface opposite to the first lateral support surface or the second lateral support surface in which the first slot is defined.

5. The table saw assembly of claim 4, wherein:
the first connecting pin extends from the second lateral support surface;
the table saw further comprises a second extension including a second extension work piece support surface pivotable with respect to the base portion between a third position whereat the second extension work piece support surface is coplanar with the base work piece support surface and a fourth position whereat the second extension work piece support surface is located above the support plane;
the second extension includes a third lateral support surface;
the third lateral support surface includes a first connecting pin receiving area; and
the first connecting pin receiving area and the first connecting pin are positioned such that when the first extension is in the second position and the second extension is in the fourth position the first connecting pin extends into the first connecting pin receiving area.

6. The table saw assembly of claim 5, wherein:
the second extension includes a second connecting pin extending from the third lateral support surface;
the base portion includes a fourth lateral support surface;
a second slot is defined in the fourth lateral support surface;
the second connecting pin includes a second shaft and a second head;
the second shaft has a second shaft length slightly longer than a second slot wall depth;
the second head has a diameter greater than a width of the second slot; and
the second slot and the second connecting pin are positioned such that when the second extension is in the third position the second shaft extends into the second slot and the second head abuts a surface opposite to the fourth lateral support surface.

7. The table saw assembly of claim 3, wherein:
the first lateral support surface abuts the second lateral support surface when the first extension is in the first position.

8. The table saw assembly of claim 3, further comprising:
a second extension including a second extension work piece support surface pivotable with respect to the base portion between a third position whereat the second extension work piece support surface is coplanar with the base work piece support surface and a fourth position whereat the second extension work piece support surface is located above the support plane, wherein:

the second extension includes a third lateral support surface;

the base portion includes a fourth lateral support surface; and the third lateral support surface is in opposition to the fourth lateral support surface when the second extension is in the third position.

9. The table saw assembly of claim 8, wherein:

the third lateral support surface is in opposition to the second lateral support surface when the first extension is in the second position and the second extension is in the fourth position; and the third lateral support surface and the second lateral support surface are spaced apart from the saw blade when the first extension is in the second position, the second extension is in the fourth position, and the saw blade is positioned to extend upwardly through the saw blade opening.

10. The table saw assembly of claim 8, wherein:

the third lateral support surface is in opposition to the second lateral support surface when the first extension is in the second position and the second extension is in the fourth position; and the third lateral support surface abuts the second lateral support surface when the first extension is in the second position and the second extension is in the fourth position.

11. The table saw assembly of claim 10, wherein:

the third lateral support surface and the second lateral support surface define a saw blade cavity when the first extension is in the second position and the second extension is in the fourth position; and the saw blade is positioned at least partially within the saw blade cavity when the first extension is in the second position, the second extension is in the fourth position, and the saw blade is positioned to extend upwardly through the saw blade opening.

12. The table saw assembly of claim 10, wherein an outline encompassing the second extension work piece support surface and the first extension work piece support surface, when projected onto the support plane, is substantially identical in size and shape to an outline of the base work piece support surface in the support plane.

13. The table saw assembly of claim 1, wherein:

the first extension includes a second lower surface opposite to the first extension work piece support surface; and the second lower surface rests on the base work piece support surface when the first extension is in the second position.

14. The table saw assembly of claim 13, wherein the first extension further comprises:

a blade cut-out extending upwardly from the second surface.

15. The table saw assembly of claim 1, further comprising:

a pivot assembly pivotably connecting the base portion and the first extension.

* * * * *